United States Patent
Bodapati

(10) Patent No.: US 10,862,838 B1
(45) Date of Patent: Dec. 8, 2020

(54) DETECTING WHETHER A MESSAGE IS ADDRESSED TO AN INTENDED RECIPIENT

(71) Applicant: Amazon Technologies, Inc., Seattle, WA (US)

(72) Inventor: Sravan Babu Bodapati, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 227 days.

(21) Appl. No.: 15/839,719

(22) Filed: Dec. 12, 2017

(51) Int. Cl.
| | |
|---|---|
| G06F 15/16 | (2006.01) |
| H04L 12/58 | (2006.01) |
| H04W 8/18 | (2009.01) |
| H04M 1/725 | (2006.01) |
| H04W 4/14 | (2009.01) |

(52) U.S. Cl.
CPC ............... *H04L 51/12* (2013.01); *H04W 8/18* (2013.01); *H04L 51/08* (2013.01); *H04L 51/10* (2013.01); *H04L 51/38* (2013.01); *H04M 1/72552* (2013.01); *H04W 4/14* (2013.01)

(58) Field of Classification Search
CPC ......... H04L 51/12; H04L 51/08; H04L 51/10; H04L 51/38; H04W 8/18; H04W 4/14; H04M 1/72552

USPC ........................................................ 709/206
See application file for complete search history.

(56) References Cited

U.S. PATENT DOCUMENTS

| | | | |
|---|---|---|---|
| 9,749,334 B2* | 8/2017 | Ebersman | H04L 63/102 |
| 9,965,462 B2* | 5/2018 | Werth | G06F 40/30 |
| 2015/0199609 A1* | 7/2015 | Rao | G06N 20/00 |
| | | | 706/12 |
| 2015/0222586 A1* | 8/2015 | Ebersman | G06F 3/04817 |
| | | | 715/752 |
| 2015/0358266 A1* | 12/2015 | Kaplinger | H04L 51/32 |
| | | | 709/206 |
| 2016/0366088 A1* | 12/2016 | Abou Mahmoud | H04L 67/306 |

\* cited by examiner

*Primary Examiner* — Atta Khan
(74) *Attorney, Agent, or Firm* — Nicholson De Vos Webster & Elliott, LLP

(57) ABSTRACT

Techniques for analyzing a message are described. For example, in some examples a message analyzer is to receive a message including message content and an indication of at least one message recipient, determine a sentiment of the message to generate at least one first sentiment value, determine at least on topic of the message content, and determine that the at least one first sentiment value is less than a second sentiment value associated with the message recipient and the at least one topic of the message content.

20 Claims, 12 Drawing Sheets

DETECTING WHETHER A MESSAGE IS ADDRESSED TO AN INTENDED RECIPIENT

BACKGROUND

Electronic messaging offers fast (and, typically, cheap or free) forms of expression. Billions of electronic messages are sent globally each day without an indication of slowing down. Those messages are sent and received via many mediums such as texting (SMS messages), instant messaging based, chats, emails, etc.

BRIEF DESCRIPTION OF DRAWINGS

Various embodiments in accordance with the present disclosure will be described with reference to the drawings, in which.

DETAILED DESCRIPTION

Figure 1:
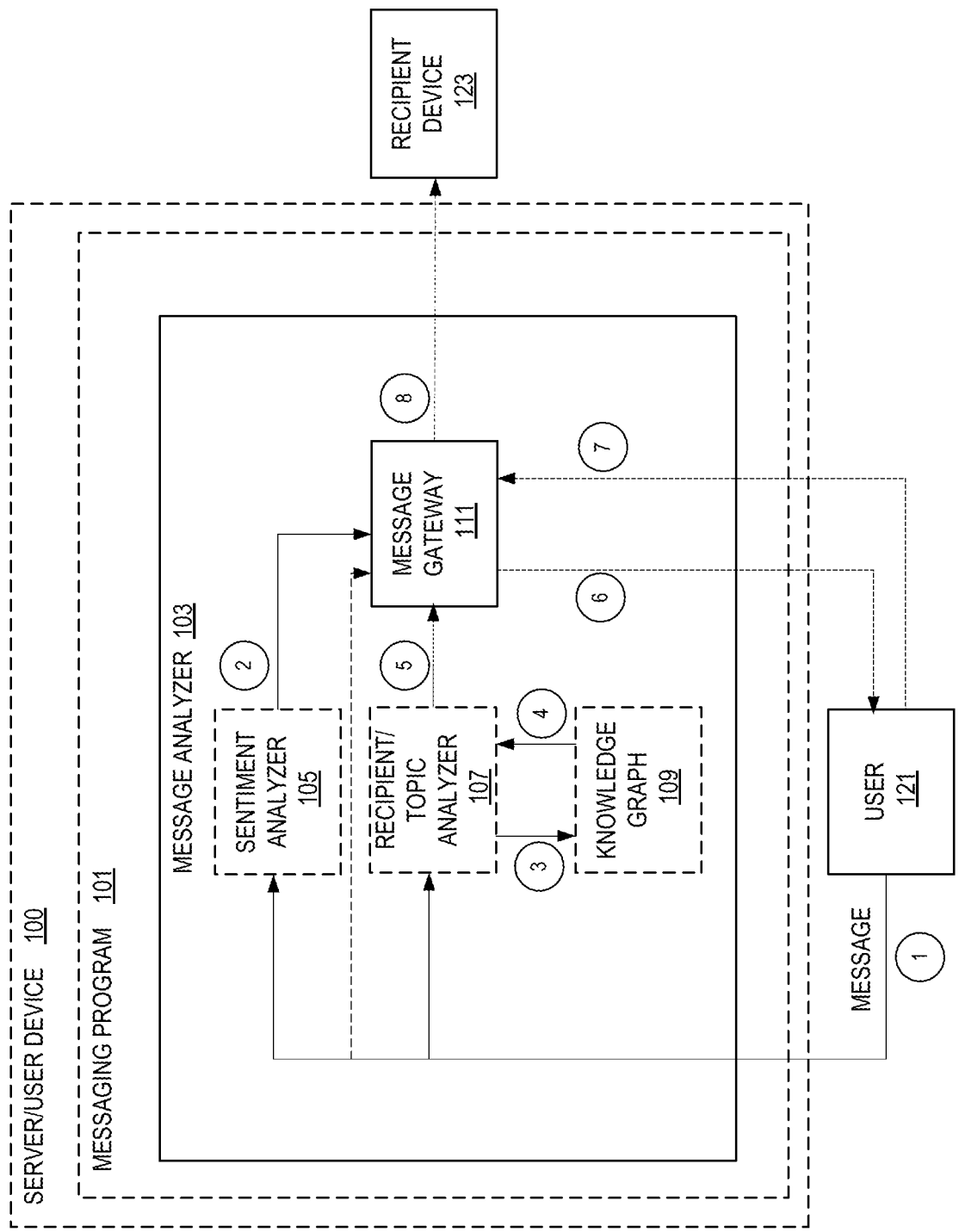
FIG. 1 illustrates an embodiment of a system for performing a determination of whether a message is addressed to an intended recipient.

Various embodiments of methods, apparatuses, systems, and non-transitory computer-readable storage media for determining whether a message is addressed to an intended recipient are described. As described above, electronic messaging (e.g., texts, chats, emails, etc.) continues to be the medium of choice for many interactions including personal and professional interactions. Unfortunately, at times, a message is sent to an unintended recipient primarily due to the quick nature of these interactions. For example, a message with the content "Stephen is a terrible manager" is probably acceptable to send a friend in a personal interaction, but sending "Stephen is a terrible manager" to Stephen is probably not okay. It is much more unlikely to send a message to an incorrect recipient using traditional forms of communication (such as sending a letter, making a phone call, etc.) where more time and care are generally exercised.

Electronic messaging has also been problematic for businesses. For example, sending medical information to the wrong person is not only embarrassing, but may also violate HIPAA guidelines. Additionally, employees have messaged themselves, or others, confidential information in violation of company policies.

Detailed herein are embodiments of comparing the content of a message with the indicated recipient of the message to determine whether the message should be sent. In some embodiments, a sentiment analysis of the message (including an analysis of text, images, or any combination of message content) is made to determine whether the sentiment is negative (and therefore possibly needing to be scrutinized) and, if so, a prompt is provided to the sender for confirmation that the message is okay to send to the indicated recipient. In some embodiments, when the sentiment analysis determines that the sentiment of the message is positive, the message is sent without prompting the sender.

In some embodiments, a knowledge graph is used to help determine whether the message is addressed to a recipient intended by the sender of the message. This knowledge graph has, when used in conjunction with sentiment analysis, information about feelings/opinions one has for another person and/or topic. In some embodiments, when the message deviates from the knowledge graph (such as when the topic has not been discussed, or the sentiment about the topic is inconsistent with previous usage), then the sender is prompted to confirm that the sender intends to send the message to the indicated recipient. However, in some embodiments, when similar topics were discussed previously, the message is evaluated according to the similar topic.

In other embodiments, sentiment analysis is not performed and, instead, other topical analysis is performed. For example, a determined topic of the message can be checked against a knowledge graph to determine whether the topic appears to be than the current addressee. In this embodiment, the knowledge graph does not have sentiment information.

FIG. 1 illustrates an embodiment of a system for performing a determination of whether a message is addressed to an intended recipient. In particular, a message analyzer 103 is shown and which is able to determine whether a message is addressed to an intended recipient and, if needed, prompts a user 121 requesting confirmation that the message is addressed to the intended recipient on recipient device 123.

In some embodiments, the message analyzer 103 is software stored in memory and is running as a part of a messaging program 101 executed by a processor on a user device 100. In other embodiments, the message analyzer 103 is at least partially contained in a server device, as will be detailed below. The messaging program 101 may be any type of messaging program such as an application, an email client, a SMS client, a chat client, etc.

A user 121 generates a message which is provided to a message to the message analyzer 103 at circle 1. The message includes an indication of at least one recipient (e.g., to: X, cc: Y, a phone number, a user name, etc.) and content such as text, image(s), or any combination thereof.

The message analyzer 103 includes several engines that may be utilized to determine whether a message is addressed to an intended recipient. As shown, these engines may include a sentiment analyzer 105, recipient/topic analyzer 107, and a message gateway 111. The message analyzer may also include, or have access to, a knowledge graph 109. Additionally, a parser may be used by one or more engines to break a message into pieces for various evaluations.

In some embodiments, the message is subjected to sentiment analysis by sentiment analyzer 105. Sentiment analysis quantifies subjective information to determine the feeling of the message with respect to the content of the message. Depending upon the implementation, the sentiment analyzer 105 may use machine learning and/or natural language processing to determine the sentiment. The sentiment may be expressed as a simple binary (positive or negative), or scaled (e.g., 0 to 1 with 0 being most negative).

In some embodiments, the entire message is analyzed as a whole for sentiment (for example, assigning a sentiment to each word and averaging the sentiment values). In other embodiments, each topic of the message is assigned a sentiment separately and those sentiments are provided by the sentiment analyzer 105. When multiple sentiments are provided, the sentiment analyzer 105 provides a topic and sentiment value to the message gateway 111.

As noted, the output value(s) of the sentiment analyzer 105 are provided to the message gateway 111 at circle 2. The message gateway 111 uses these value(s) in its determination of whether the message needs further input from the user 121. In some embodiments where a recipient/topic analysis is not performed, the message gateway 111 makes a binary decision on whether or not a prompt for confirmation is needed. Table I below illustrates an exemplary value-to-action ruleset. The sentiment values of the ruleset are global in some embodiments. In other embodiments, the sentiment values are tailored to the user (for example, a more cynical user may require more negativity in order to be prompted). In an embodiment, data structure(s) for this sentiment value to action mapping are stored in the message gateway 111.

TABLE I

| Sentiment Value | Action |
| --- | --- |
| 0-.5 | Prompt user |
| .51-1 | Do not prompt user; allow message as is |

In some embodiments, the message is subjected to a recipient and topic analysis by recipient/topic analyzer 107. In particular, the content of the message is evaluated by the recipient/topic analyzer 107 to determine one or more topics of the message and the indicated recipient(s) of the message.

At circle 3, the recipient/topic analyzer 107 queries a knowledge graph 109 associated with the user 121 based upon the message evaluation. The knowledge graph 109 includes people the user 121 has interacted with in the past and topics the user 121 and the user's connections have interacted about.

Figure 2:
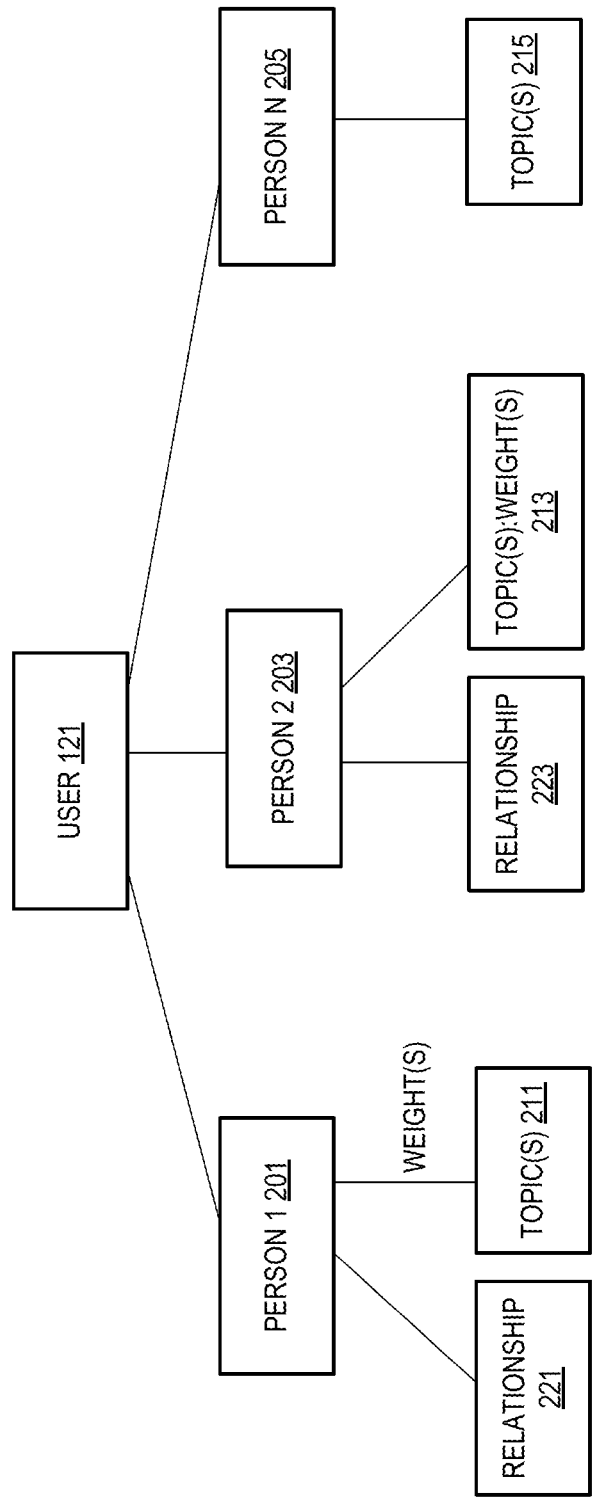
FIG. 2 illustrates exemplary implementations of a knowledge graph corresponding to a user.

FIG. 2 illustrates exemplary implementations of a knowledge graph corresponding to a user. In this example, user 121 has connected with person 1 201, person 2 203, and person N 205. In some embodiments, the knowledge graph stores relationships 221 and 223 to these persons 201-205 and one or more topics 211, 213, and 215 that have been discussed.

Sentiment values are also stored per topic as weights. In some embodiments, the weights are stored as edges (see person 1 201). In other embodiments, the weights are stored with the topics (for example, see person 2 203 and topics: weights 213). The weights are typically updated as more interactions occur between the user 121 and person 1 201 and person 2 203. A sentiment value is not currently stored in association with Person N 205.

In some embodiments, the topics to be stored in the knowledge graph are subject to removal. For example, topics are decayed such that topics that are not used often are removed.

The knowledge graph 109 query is returned at circle 4 to the recipient/topic analyzer 107. The recipient/topic analyzer 107 then forwards the sentiment value(s) associated with the indicated recipient(s) for the topic(s) of the message to the message gateway at circle 5. In some embodiments, one of the sentiment analyzer 105 or recipient/topic analyzer 107 sends the message itself to the message gateway 111. In other embodiments, the message gateway 111 receives the message from the user 121.

The message gateway 111 takes the inputs of circle 2 and/or circle 5 and determines whether to display a prompt to the user 121. In some embodiments, the message gateway 111 makes binary decision based on the recipient/topic value and the sentiment value from the sentiment analyzer. Table II below illustrates an exemplary value-to-action ruleset. The sentiment values of the ruleset are global in some embodiments. In other embodiments, the sentiment values are tailored to the user (for example, a more cynical user may require more negativity before a prompt). In an embodiment, data structure(s) for this sentiment value-to-action mapping are stored in the message gateway 111.

TABLE II

| Sentiment Value for a Recipient/Topic | Action |
| --- | --- |
| 0-.5 | Prompt user (the upper sentiment value comes from the knowledge graph) |
| .51-1 | Do not prompt user; allow message as is |

In other embodiments, a more nuanced decision of whether a prompt for confirmation is to be generated. Table III below illustrates an exemplary value-to-action ruleset. The sentiment values of the ruleset are global in some embodiments. In other embodiments, the sentiment values are tailored to the user (for example, a more cynical user may require more negativity before a prompt). In an embodiment, a data structure or data structures for this sentiment value to action mapping are stored in the message gateway 111.

TABLE III

| Sentiment Value for a Recipient/Topic | Action |
| --- | --- |
| 0-.2 | Prompt user regardless of knowledge graph query |
| .21-.5 | Prompt user dependent upon knowledge graph query (the upper sentiment value comes from the knowledge graph) |
| .51-1 | Do not prompt user; allow message as is |

Depending upon the inputs and ruleset evaluation, the message gateway 111 causes a prompt to be displayed to user 121 at circle 6. This prompt requests the user 121 to confirm that the user intends to send the message to the recipient indicated by the message. This prompt may be in the form of a pop-up, dialog box, etc. At circle 7, the message gateway 111 receives a response to the prompt. The message gateway 111 then uses this response, at circle 8, to determine whether to send the message to the recipient, or to block the message from being sent.

Figure 3A:
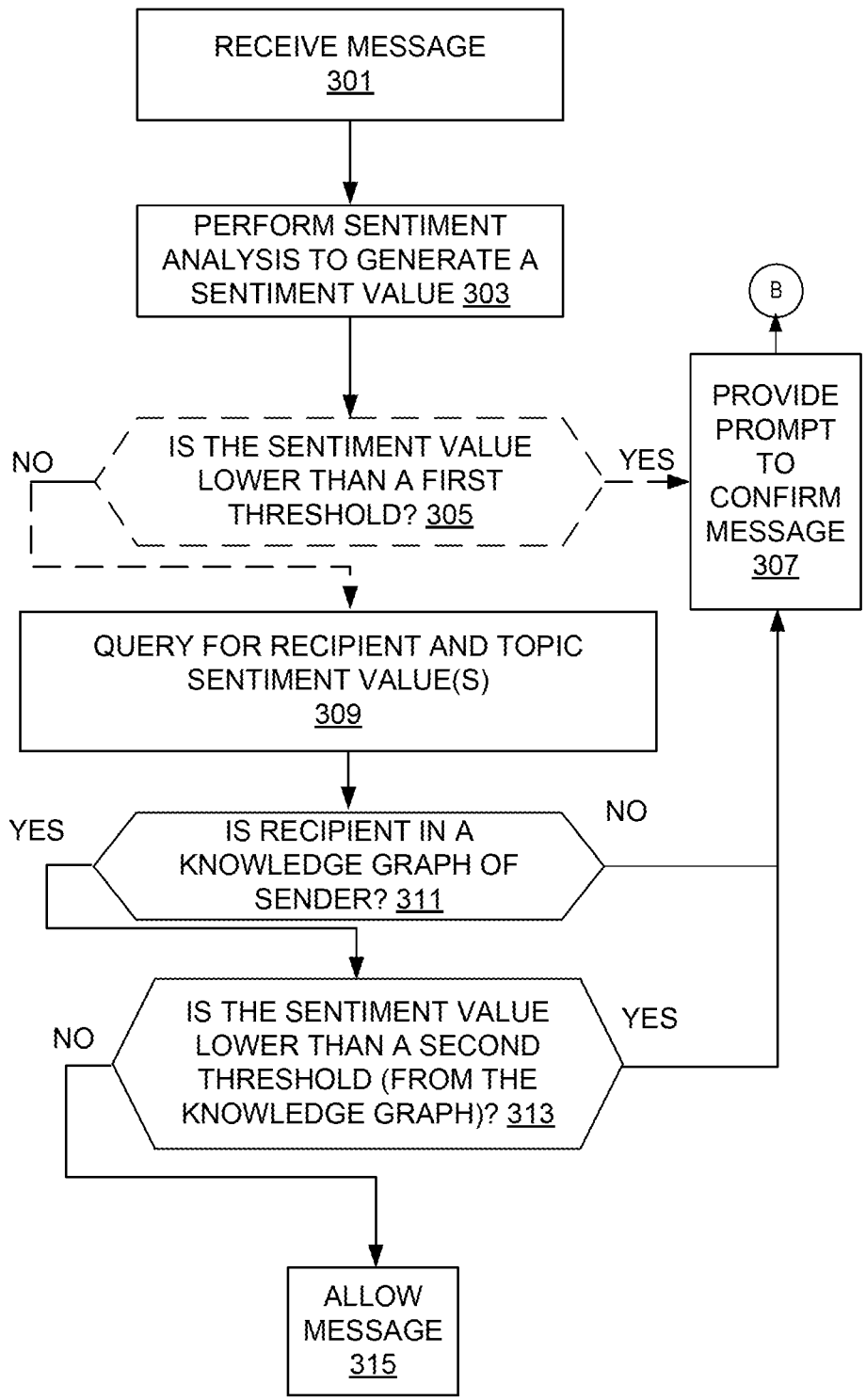
FIGS. 3(A)-(B) illustrate an embodiment of a method performed by a message analyzer executing on a computer.
Figure 3B:
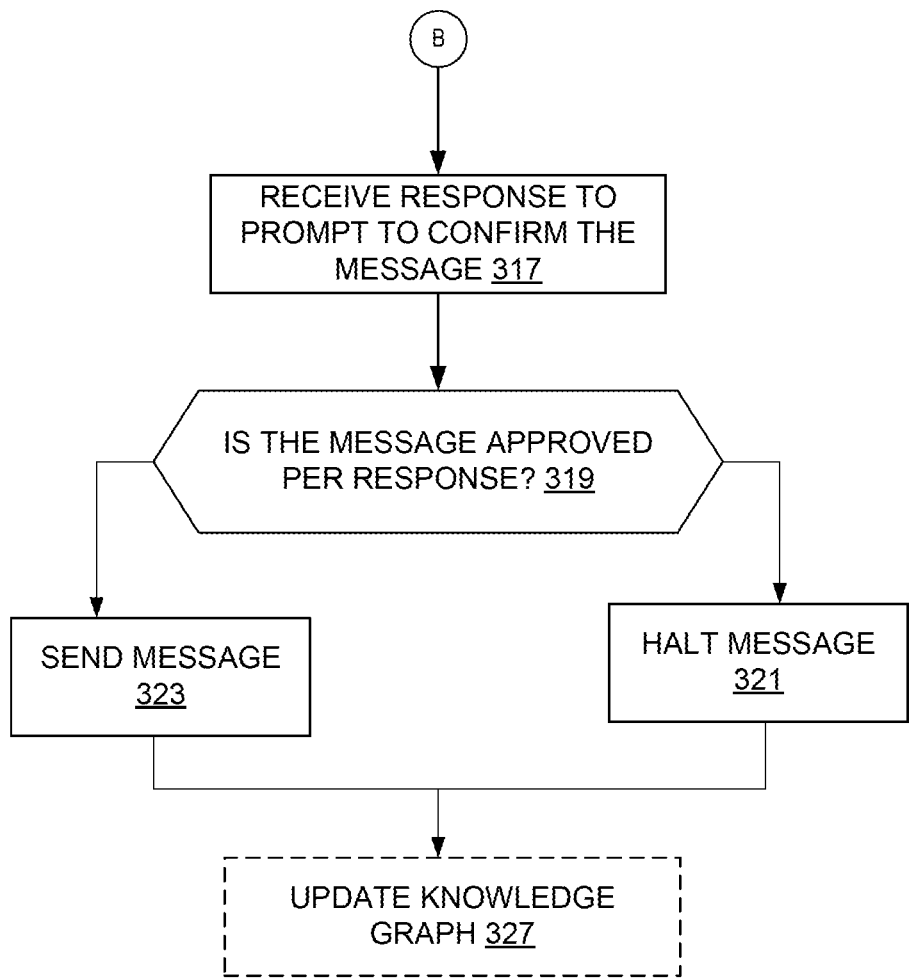

FIGS. 3(A)-(B) illustrate an embodiment of a method performed by a message analyzer executing on a computer. An exemplary message analyzer has been detailed above.

A message from a user is received at 301. As detailed, the message includes content and an indication of at least one recipient.

In some embodiments, a sentiment analysis is performed at 303 to generate a sentiment value or values for the message. For example, sentiment analyzer 105 evaluates the received message to determine one or more sentiment values for the message and/or topics of the message.

In some embodiments, a determination of whether the sentiment value (or any one sentiment value) is less than a first threshold is made at 305. For example, message gateway 111 uses a ruleset to determine whether the sentiment value(s) are below a first threshold. Typically, this threshold is a global value applied to all users.

When the sentiment value(s) is below the first threshold, a prompt is provided to the user attempting to send the message at 307. This prompt requests the user to confirm that the user intends to send the message to the indicated recipient(s) (in other words, the prompt requests the user to confirm that the content is appropriate for the indicated recipient(s)).

When the sentiment value(s) are not below the first threshold, a query for known sentiment value(s) for the indicated recipient and the topic(s) of the message is made at 309. As detailed, the message is broken into topics which are used to query a knowledge graph (or other data structure) for known sentiment values for the topic(s) for the indicated recipient(s).

At 311, a determination of whether an indicated recipient is in the knowledge graph (or other data structure that can be queried) is made. If the indicated recipient is not in the graph, a prompt is provided to the user that sent the message at 313. If the indicated recipient is in the graph, a determination of whether the calculated sentiment value (or any one sentiment value) is less than a second threshold is made at 309. The second threshold is the threshold returned from the query to the knowledge graph. For example, for the indicated recipient, the message gateway 111 determines if at least one topic of the message has a sentiment value above the generated sentiment value of 303. In essence, the message gateway 111 determines whether the sentiment been allowed in the past.

When the second threshold has not been met, a prompt is provided to the user that sent the message at 307. When the second threshold has been met, the message is sent at 315.

After the prompt has been provided, a response is received at 317. This response can either confirm the message is approved or deny it at 319. If the response approves the message, then the message is sent at 323; if the response disapproves the message, the message is prevented from being sent at 321. In some embodiments, the absence of a response from the user is interpreted as disapproval of the message being sent (that is, the message is sent only if the user affirmatively approves the sending of the message). In other embodiments, a message is prevented from being sent only if the user affirmatively disapproves the sending of the message. In some embodiments, the approval or denial is used to update the knowledge graph for that recipient/topic at 327. For example, the threshold value that is stored in the knowledge graph may be increased for an approval.

In some embodiments, when a user does not approve the message in response to the prompt the user is provided with the message to make alterations to the message content, recipients, or both. In other embodiments, the message is dropped.

FIGS. 4(A)-(F) illustrate example uses of a message analyzer.

Figure 4A:
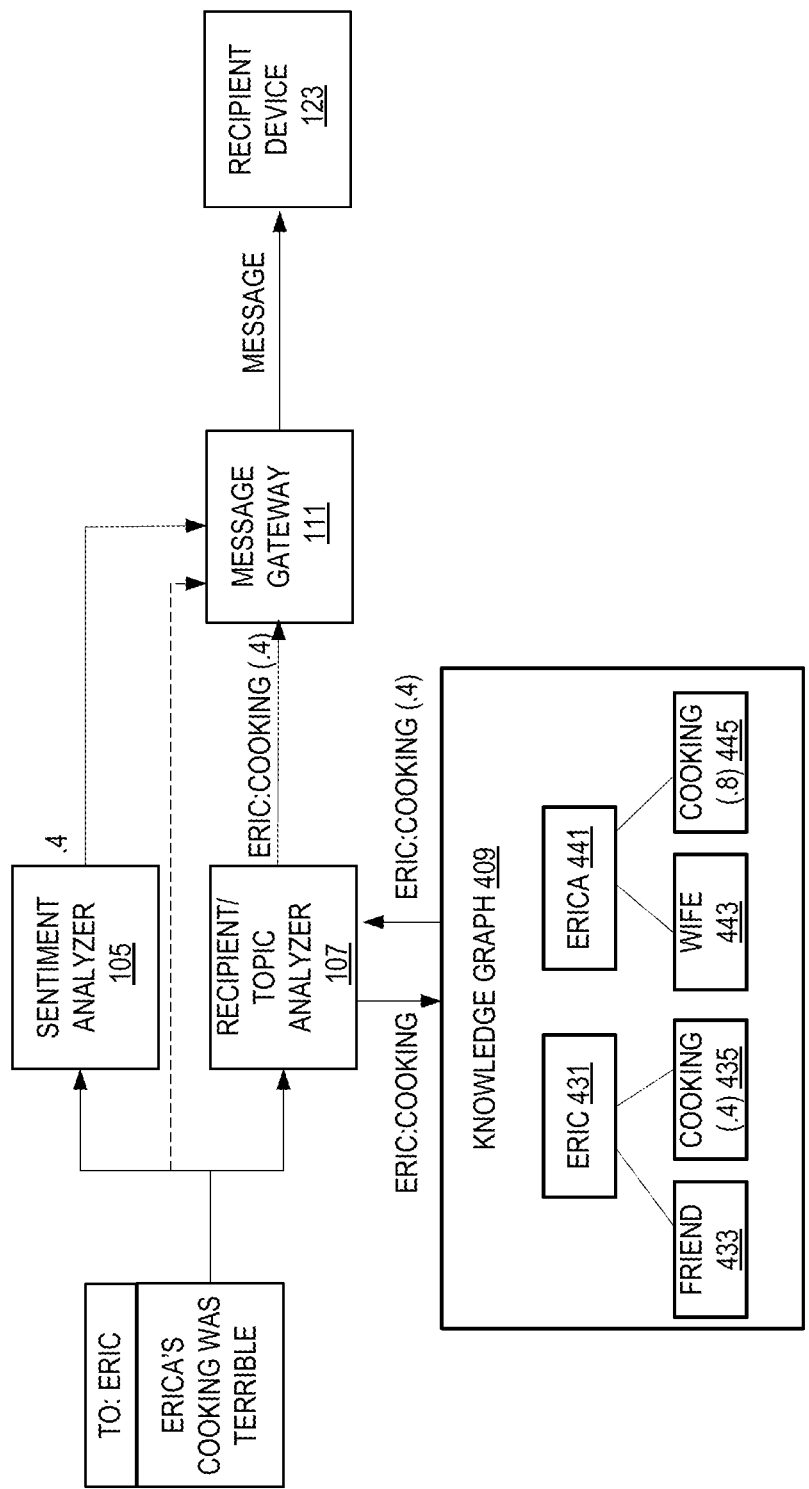
FIGS. 4(A)-(F) illustrate example uses of a message analyzer.

FIG. 4(A) illustrates an example of using a message analyzer where sentiment analysis is performed. In this example, the message includes an indication that "Eric" is the recipient and the content of the message is "Erica's cooking was terrible." This message is provided to the sentiment analyzer 105 and recipient/topic analyzer 107.

The sentiment analyzer 105 quantifies the subjective information of the message ("Erica's cooking was terrible") to determine the sentiment of the message. In this instance, the topic is cooking and, because the message stated that the cooking was "terrible," the sentiment analyzer 105 outputs a negative sentiment to the message gateway 111. In this example, it was a 0.4 out of 1.

The recipient/topic analyzer 107 performs a query of the knowledge graph 409 based on the message. In particular, the recipient/topic analyzer 107 uses the message to generate a query for the indicated recipient ("Eric" 431) regarding cooking. The knowledge graph 409 includes two people the user has interacted with: Eric 431 and Erica 441. Eric is a friend 433 and previous discussions about cooking 435 have allowed negative sentiment. Erica 441 is the user's wife 443 and previous discussions about cooking 445 have used positive sentiment. The query for Eric:cooking (person: topic) results in a return of a value of 0.4 sentiment for cooking with respect to Eric, which is forwarded to the message gateway 111.

The message gateway 111 determines that the sentiment of the message is consistent with past usage based on the outputs of the sentiment analyzer 105 and recipient/topic analyzer 107 and allows the message to be sent without prompting.

Figure 4B:
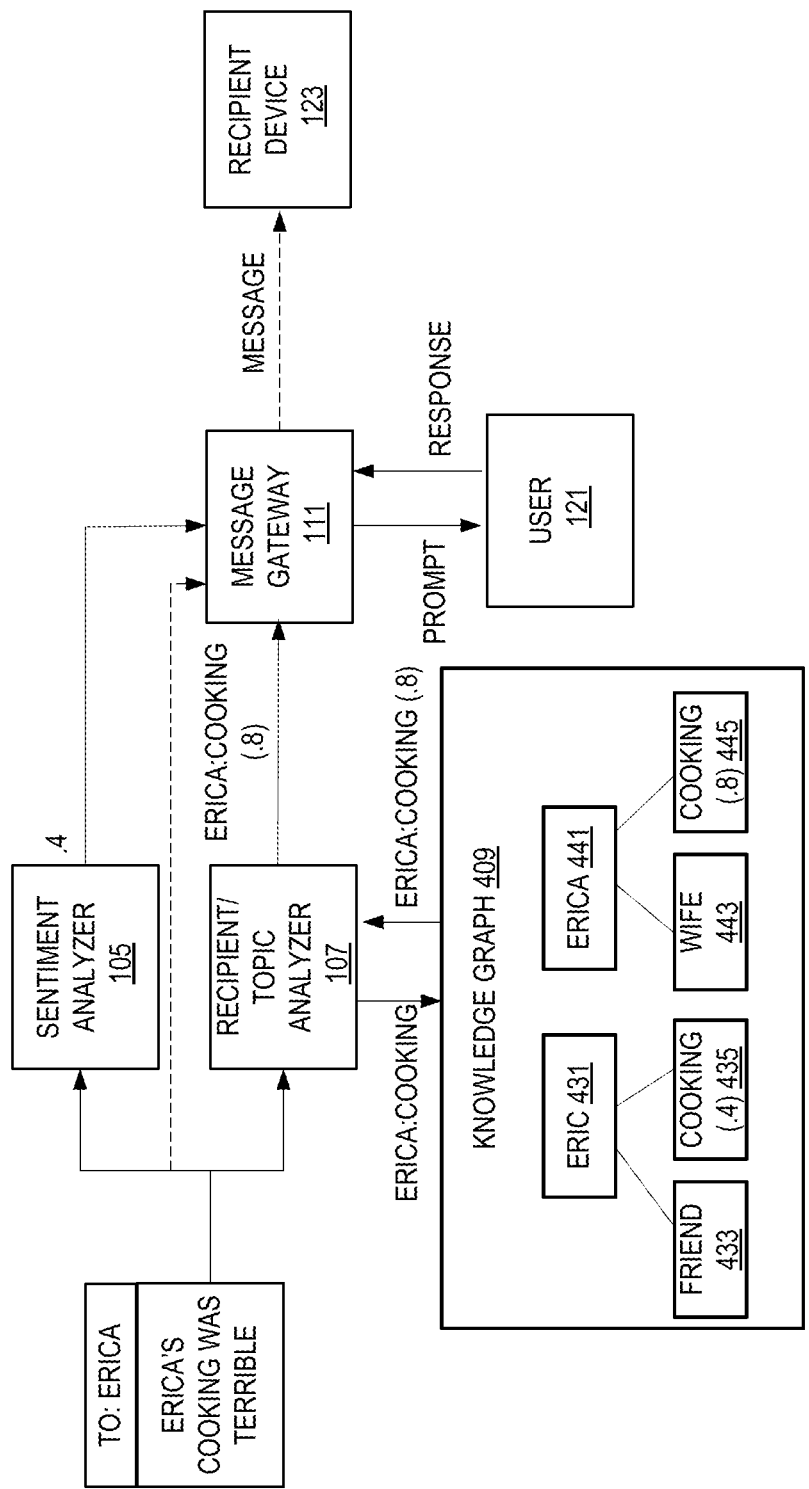

FIG. 4(B) illustrates an example of using a message analyzer where sentiment analysis is performed. In this example, the message includes an indication that "Erica" is the recipient and the content of the message is "Erica's cooking was terrible." This message is provided to the sentiment analyzer 105 and recipient/topic analyzer 107.

The sentiment analyzer 105 quantifies the subjective information of the message ("Erica's cooking was terrible") to determine the feeling of the message. In this instance, the topic is cooking and given that it was "terrible" the sentiment analyzer 105 outputs a negative sentiment to the message gateway 111. In this example, it was a 0.4 out of 1.

The recipient/topic analyzer 107 performs a query of the knowledge graph 409 based on the message. In particular, the recipient/topic analyzer 107 uses the message to generate a query for the indicated recipient ("Erica" 431) regarding cooking. The knowledge graph 409 includes two people the user has interacted with: Eric 431 and Erica 441. Eric is a friend 433 and previous discussions about cooking 435 have allowed negative sentiment. Erica 441 is the user's wife 443 and previous discussions about cooking 445 have used positive sentiment. The query for Erica:cooking (person: topic) results in a return of a value of 0.8 sentiment for cooking with respect to Erica which is forwarded to the message gateway 111.

The message gateway 111 determines that the sentiment of the message is inconsistent with past usage based on the outputs of the sentiment analyzer 105 and recipient/topic analyzer 107 and prompts the user 121 to approve the message.

Figure 4C:
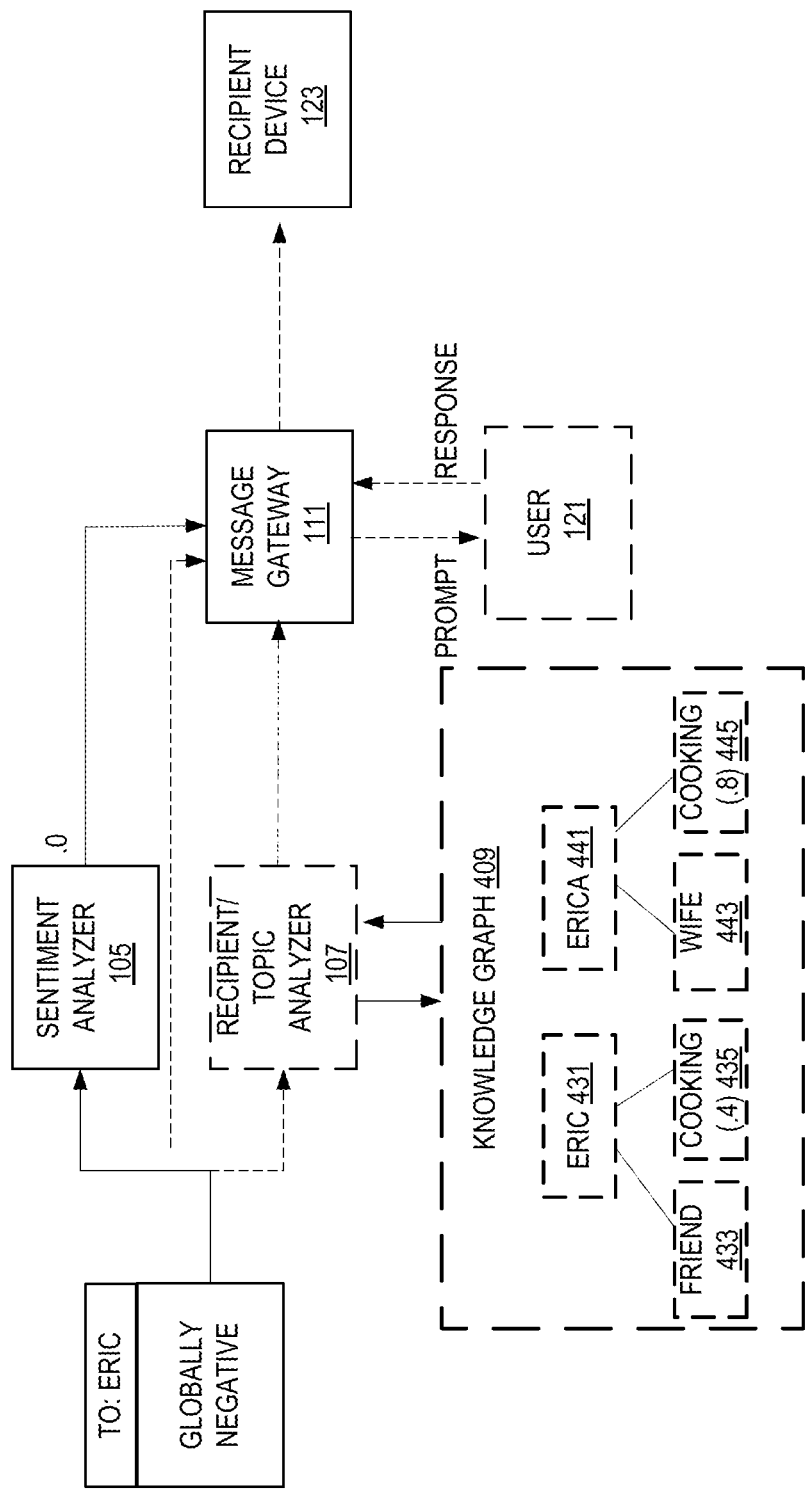

FIG. 4(C) illustrates an example of using a message analyzer where sentiment analysis is performed. In this example, the message includes an indication that "Erica" is the recipient and the content of the message is "Erica's cooking was terrible." This message is provided to the sentiment analyzer 105 and recipient/topic analyzer 107.

The sentiment analyzer 105 quantifies the subjective information of the message (Globally Negative Text) to determine the feeling of the message. In this instance, the sentiment analyzer 105 outputs a negative sentiment to the message gateway 111. In this example, it was a 0 out of 1.

Whether or not the recipient/topic analyzer 107 performs a query of the knowledge graph 409 based on the message is not relevant as the output of the sentiment analyzer is globally unacceptable.

The message gateway 111 determines that the sentiment of the message is generally not acceptable with past usage based on the outputs of the sentiment analyzer 105 and prompts the user 121 to approve the message.

Figure 4D:
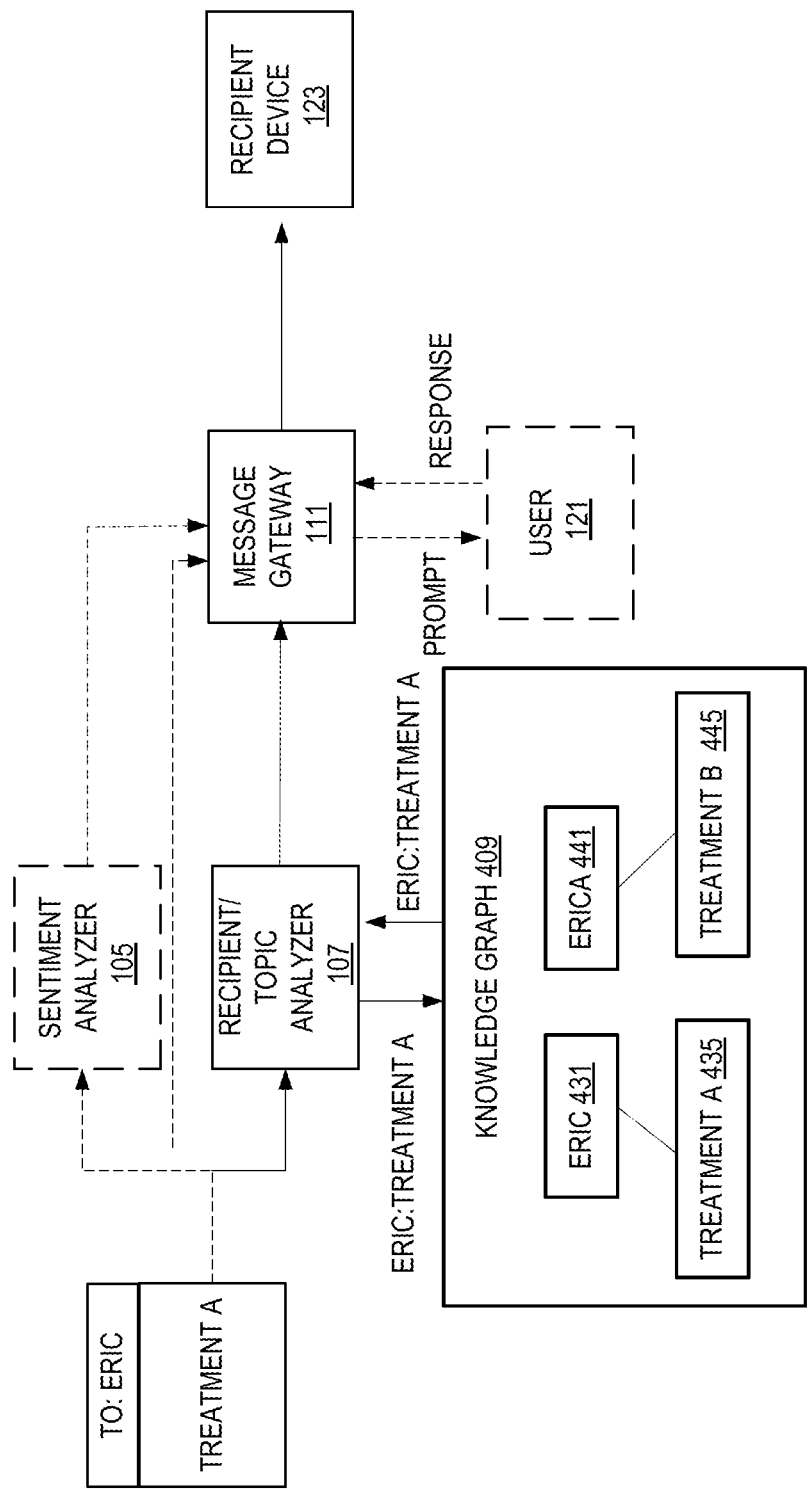

FIG. 4(D) illustrates an example of using a message analyzer where sentiment analysis is not performed. In this example, the message includes an indication that "Eric" is the recipient and the content of the message is with respect to "treatment A" that Eric has had. This message is provided to the recipient/topic analyzer 107.

The recipient/topic analyzer 107 performs a query of the knowledge graph 409 based on the message. In particular, the recipient/topic analyzer 107 uses the message to generate a query for the indicated recipient ("Eric" 431) regarding treatment A. The knowledge graph 409 includes two people the user has interacted with Eric 431 and Erica 441. Eric 431 has had treatment A 435 and Erica 441 has had treatment B. The query for Eric:treatment A (person:topic) results in a return of Eric:treatment A, which is forwarded to the message gateway 111.

The message gateway 111 determines that the content of the message is inconsistent with the knowledge graph and prompts the user 121 to approve the message.

Figure 4E:
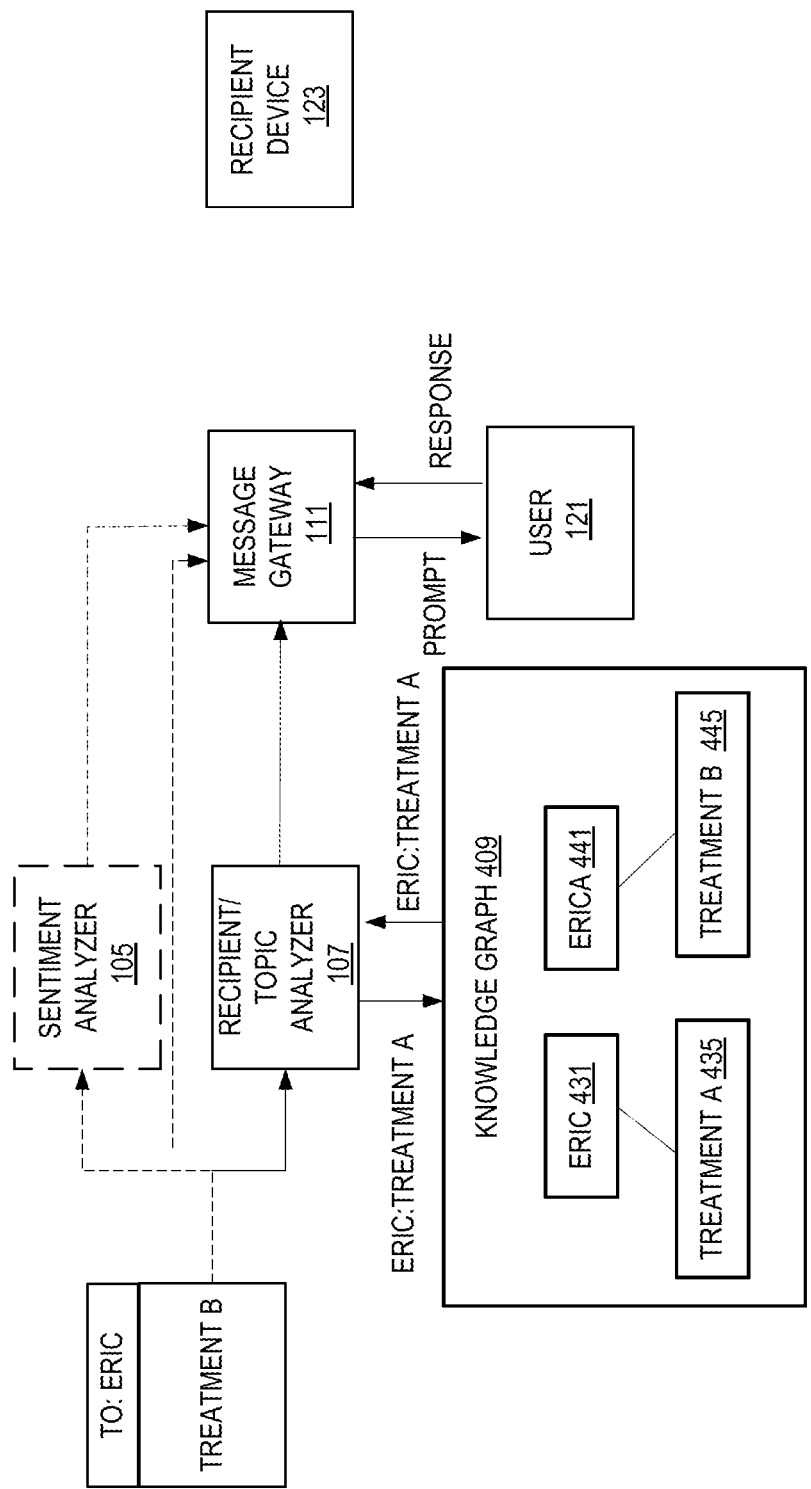

FIG. 4(E) illustrates an example of using a message analyzer where sentiment analysis is not performed. In this example, the message includes an indication that "Eric" is the recipient and the content of the message is with respect to "treatment A" that Eric has had. This message is provided to the recipient/topic analyzer 107.

The recipient/topic analyzer 107 performs a query of the knowledge graph 409 based on the message. In particular, the recipient/topic analyzer 107 uses the message to generate a query for the indicated recipient ("Eric" 431) regarding treatment A. The knowledge graph 409 includes two people the user has interacted with Eric 431 and Erica 441. Eric 431 has had treatment A 435 and Erica 441 has had treatment B. The query for Eric:treatment A (person:topic) results in a return of Eric:treatment B which is forwarded to the message gateway 111.

The message gateway 111 determines that the content of the message is inconsistent with the knowledge graph and prompts the user 121 to approve the message.

Figure 4F:
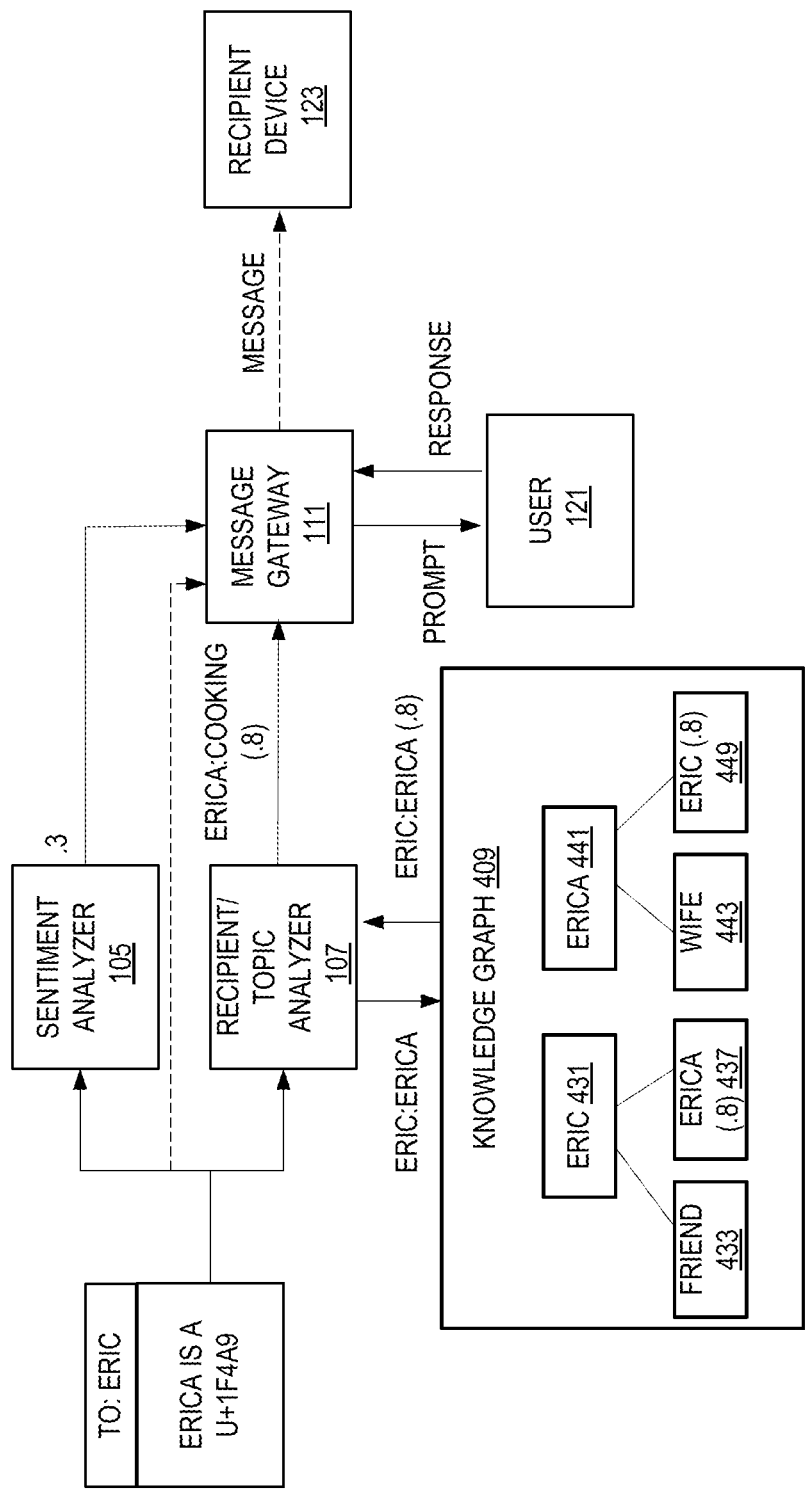

FIG. 4(F) illustrates an example of using a message analyzer where sentiment analysis is performed on an image. In this example, the message includes an indication that "Erica" is the recipient and the content of the message is "Erica's is a [emoji coded as U+1F4A9]." This message is provided to the sentiment analyzer 105 and recipient/topic analyzer 107.

The sentiment analyzer 105 quantifies the subjective information of the message to determine the sentiment of the message. In this instance, the topic is Erica and, because the emoji is not associated with a favorable sentiment, the sentiment analyzer 105 outputs a negative sentiment to the message gateway 111. In this example, it was a 0.3 out of 1.

The recipient/topic analyzer 107 performs a query of the knowledge graph 409 based on the message. In particular, the recipient/topic analyzer 107 uses the message to generate a query for the indicated recipient ("Erica" 431) regarding cooking. The knowledge graph 409 includes two people the user has interacted with Eric 431 and Erica 441. Eric is a friend 433 and previous discussions about Erica 437 have been positive. Erica 441 is the user's wife 443 and previous discussions about Eric 449 have used positive sentiment. The query for Eric:Erica (person:topic) results in a return of a value of 0.8 sentiment for cooking with respect to Erica which is forwarded to the message gateway 111.

The message gateway 111 determines that the sentiment of the message is inconsistent with past usage based on the outputs of the sentiment analyzer 105 and recipient/topic analyzer 107 and prompts the user 121 to approve the message.

Various embodiments may further include receiving, sending, or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

Figure 5:
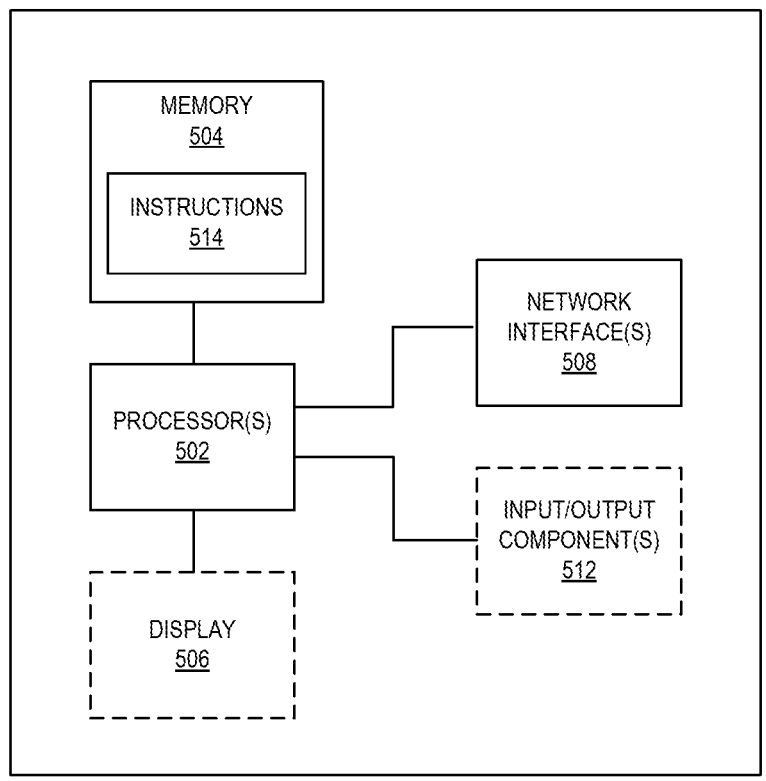
FIG. 5 illustrates a logical arrangement of a set of general components of an exemplary computing device that can be utilized in accordance with various embodiments.

FIG. 5 illustrates a logical arrangement of a set of general components of an example computing device such as server or user device 100, etc. Generally, a computing device can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 502 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 504) to store code (e.g., instructions 514) and/or data, and a set of one or more wired or wireless network interfaces 508 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 504) of a given electronic device typically stores code (e.g., instructions 514) for execution on the set of one or more processors 502 of that electronic device. One or more parts of various embodiments may be implemented using different combinations of software, firmware, and/or hardware.

A computing device can include some type of display element 506, such as a touch screen or liquid crystal display (LCD), although many devices such as portable media players might convey information via other means, such as through audio speakers, and other types of devices such as server end stations may not have a display element 506 at all. As discussed, some computing devices used in some embodiments include at least one input and/or output component(s) 512 able to receive input from a user. This input component can include, for example, a push button, touch pad, touch screen, wheel, joystick, keyboard, mouse, keypad, or any other such device or element whereby a user is able to input a command to the device. In some embodiments, however, such a device might be controlled through a combination of visual and/or audio commands and utilize a microphone, camera, sensor, etc., such that a user can control the device without having to be in physical contact with the device.

Figure 6:
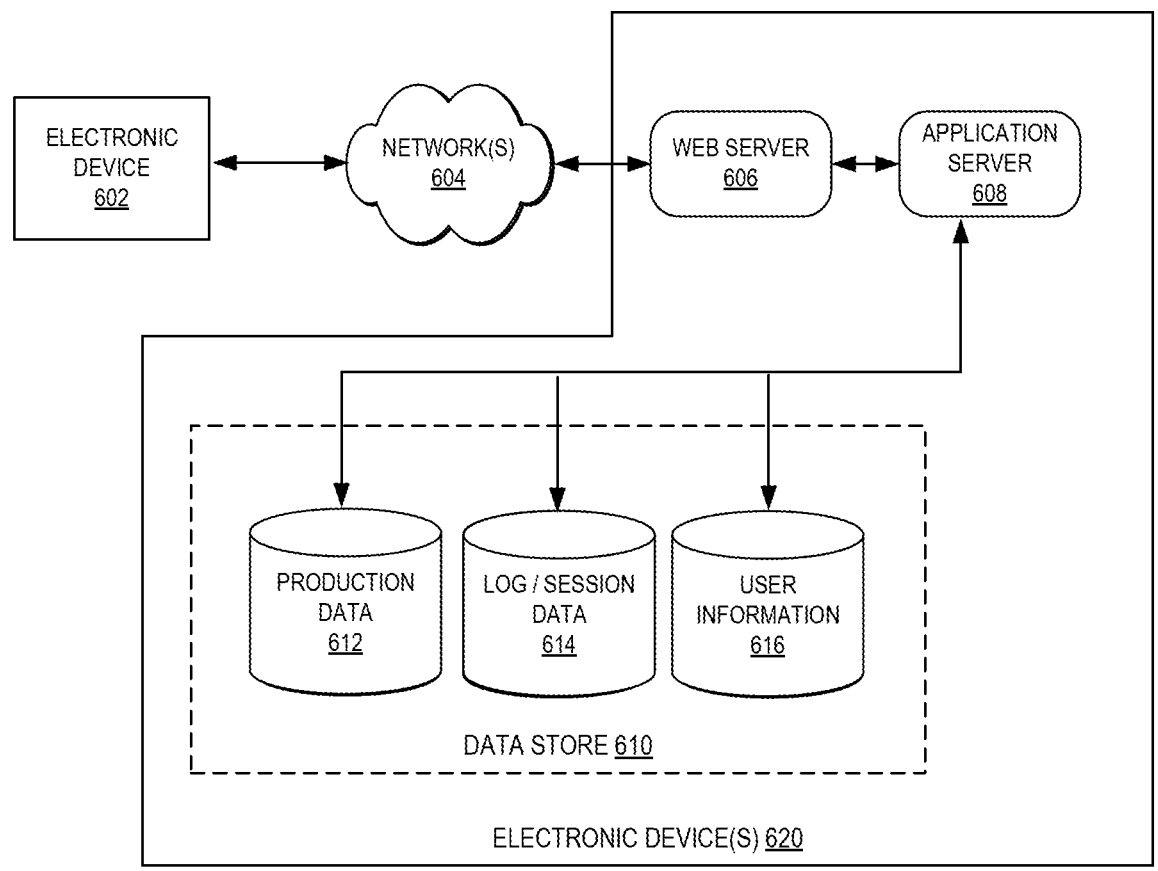
FIG. 6 illustrates an example of an environment for implementing aspects in accordance with various embodiments.

As discussed, different approaches can be implemented in various environments in accordance with the described embodiments. For example, FIG. 6 illustrates an example of an environment for implementing aspects in accordance with various embodiments. For example, in some embodiments the messages are HyperText Transfer Protocol (HTTP) requests that are received by a web server (e.g., web server 606), and the users, via electronic devices, may interact with the provider network via a web portal provided via the web server 606 and application server 608. As will be appreciated, although a web-based environment is used for purposes of explanation, different environments may be used, as appropriate, to implement various embodiments. The system includes an electronic client device 602, which may also be referred to as a client device and can be any appropriate device operable to send and receive requests, messages or information over an appropriate network 604 and convey information back to a user of the device 602. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 604 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 604 includes the Internet, as the environment includes a web server 606 for receiving requests and serving content in response thereto, although for other networks an alternative device serving a similar purpose could be used, as would be apparent to one of ordinary skill in the art.

The illustrative environment includes at least one application server 608 and a data store 610. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server 608 can include any appropriate hardware and software for integrating with the data store 610 as needed to execute aspects of one or more applications for the client device 602 and handling a majority of the data access and business logic for an application. The application server 608 provides access control services in cooperation with the data store 610 and is able to generate content such as text, graphics, audio, video, etc., to be transferred to the client device 602, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 602 and the application server 608, can be handled by the web server 606. It should be understood that the web server 606 and application server 608 are not required and are merely example components, as structured code discussed herein can be executed on any appropriate device or host machine as discussed elsewhere herein.

The data store 610 can include several separate data tables, databases, or other data storage mechanisms and media for storing data relating to a particular aspect. For example, the data store illustrated includes mechanisms for storing production data 612 and user information 616, which can be used to serve content for the production side. The data store 610 also is shown to include a mechanism for storing log or session data 614. It should be understood that there can be many other aspects that may need to be stored in the data store, such as page image information and access rights information, which can be stored in any of the above listed mechanisms as appropriate or in additional mechanisms in the data store 610. The data store 610 is operable, through logic associated therewith, to receive instructions from the application server 608 and obtain, update, or otherwise process data in response thereto. In one example, a user might submit a search request for a certain type of item. In this case, the data store 610 might access the user information 616 to verify the identity of the user and can access a production data 612 to obtain information about items of that type. The information can then be returned to the user, such as in a listing of results on a web page that the user is able to view via a browser on the user device 602. Information for a particular item of interest can be viewed in a dedicated page or window of the browser.

The web server 606, application server 608, and/or data store 610 may be implemented by one or more electronic devices 620, which can also be referred to as electronic server devices or server end stations, and may or may not be located in different geographic locations. Each of the one or more electronic devices 620 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 6. Thus, the depiction of the environment in FIG. 6 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic.

Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The specification and drawings are, accordingly, to be regarded in an illustrative rather than a restrictive sense. It will, however, be evident that various modifications and changes may be made thereunto without departing from the broader spirit and scope of the disclsoure as set forth in the claims.

What is claimed is:

1. A computer-implemented method comprising:
   receiving, by a message analyzer of a messaging program running on a user device, a message including message content and an indication of at least one message recipient;
   determining a sentiment of the message content to generate a first sentiment value;
   determining at least one topic of the message content;
   querying a knowledge graph for a second sentiment value associated with (a) the message recipient and (b) the at least one topic of the message content;
   determining that the first sentiment value is less than the second sentiment value associated with the message recipient and the at least one topic of the message content;
   causing display of a prompt requesting confirmation to send the message; and
   blocking the message from being sent upon receipt of a response to the prompt that the message is not to be sent.

2. The computer-implemented method of claim 1, wherein the message content is at least one of a topic discussion in text and an image.

3. The computer-implemented method of claim 1, wherein the knowledge graph stores information about people a sender of the message has previously interacted with, wherein the information includes the at least one topic of the message content and a sentiment value associated with that topic based on the previous interactions.

4. A computer-implemented method comprising:
   receiving a message including message content and an indication of at least one message recipient;
   determining a sentiment of the message to generate at least one first sentiment value;
   determining at least one topic of the message content;
   determining that the at least one first sentiment value is less than a second sentiment value associated with the at least one message recipient and the at least one topic of the message content;
   causing a display of a prompt to confirm the message is appropriate to send; and
   blocking the message upon receipt of a response to the prompt that the message is not to be sent.

5. The computer-implemented method of claim 4, further comprising:
   querying a knowledge graph for the second sentiment value associated with the at least one message recipient and the at least one topic of the message content.

6. The computer-implemented method of claim 5, further comprising determining that the at least one message recipient is included in the knowledge graph, wherein when the at least one message recipient is not in the knowledge graph, the at least one message recipient is to be added to the knowledge graph.

7. The computer-implemented method of claim 5, wherein the knowledge graph stores information about people the sender of the message has previously interacted with, wherein the information includes the at least one topic of the message content and a sentiment value associated with that topic based on the previous interactions.

8. The computer-implemented method of claim 4, further comprising:
   determining that the at least one first sentiment value is not less than a global sentiment value.

9. The computer-implemented method of claim 4, wherein the message content is at least one of a topic discussion in text and an image.

10. The computer-implemented method of claim 4, wherein the at least one first sentiment value is a value from 0 to 1 with more negative sentiment being closer to 0.

11. The computer-implemented method of claim 4, wherein the at least one first sentiment value is a value on a scale with more negative sentiment being closer to one end of the scale.

12. The computer-implemented method of claim 4, further comprising:
   updating the second sentiment value associated with the at least one message recipient and the at least one topic of the message content based on the response to the prompt.

13. A system comprising:
    a processor to execute code;
    memory to store code, wherein the code implements a message analyzer to:
      receive a message including message content and an indication of at least one message recipient;
      determine a sentiment of the message to generate at least one first sentiment value;
      determine at least on topic of the message content;
      determine that the at least one first sentiment value is less than a second sentiment value associated with the message recipient and the at least one topic of the message content;
      cause a display of a prompt to confirm the message is appropriate to send; and
      block the message upon receipt of a response to the prompt that the message is not to be sent.

14. The system of claim 13, wherein the message analyzer is further to:
    query a knowledge graph for the second sentiment value associated with the at least one message recipient and the at least one topic of the message content.

15. The system of claim 14, wherein the message analyzer is further to:
    determine that the at least one message recipient is included in the knowledge graph, wherein when the at least one message recipient is not in the knowledge graph the at least one message recipient is to be added to the knowledge graph.

16. The system of claim 14, wherein the knowledge graph is to store information about people the sender of the message has previously interacted with, wherein the information includes the at least one topic and a sentiment value associated with that topic based on the previous interactions.

17. The system of claim 13, wherein the message analyzer is further to:
    determine that the at least one first sentiment value is not less than a global sentiment value.

18. The system of claim 13, wherein the message content is at least one of a topic discussion in text and an image.

19. The system of claim 13, wherein the at least one first sentiment value is a value from 0 to 1 with more negative sentiment being closer to 0.

20. The system of claim 13, wherein the message analyzer is further to:
- update the second sentiment value associated with the at least one message recipient and the at least one topic of the message content based on the response to the prompt.

* * * * *